United States Patent [19]
Dong-Joo

[11] Patent Number: 5,850,954
[45] Date of Patent: Dec. 22, 1998

[54] HOLDER ASSEMBLY FOR CELLULAR PHONES

[76] Inventor: Kim Dong-Joo, Joong-Ang Spring 192-30 Haengdang-dong, Seongdong-ku, Seoul 133-070, Rep. of Korea

[21] Appl. No.: 969,556

[22] Filed: Nov. 13, 1997

[30] Foreign Application Priority Data

Sep. 20, 1997 [KR] Rep. of Korea .................. 1997-26277

[51] Int. Cl.[6] ...................................................... A45F 5/00
[52] U.S. Cl. ........................... 224/197; 224/272; 224/271; 224/930; 224/199; 24/597; 24/665; 24/3.7; 24/3.11
[58] Field of Search ..................................... 224/191, 197, 224/198, 199, 271, 272, 930; 24/597, 665, 3.1, 3.7, 3.11, 587, 590, 591, 593, 594, 595, 596; 248/225.11, 222.11, 222.13; 403/326, 327; 379/455; 455/100

[56] References Cited

U.S. PATENT DOCUMENTS

| | | | |
|---|---|---|---|
| 5,014,892 | 5/1991 | Copeland | 224/271 |
| 5,026,016 | 6/1991 | Lisowski | 248/225.11 |
| 5,201,858 | 4/1993 | Otrusina | 224/272 |
| 5,375,749 | 12/1994 | Oliva | 224/272 |
| 5,540,368 | 7/1996 | Oliva | 224/272 |
| 5,620,120 | 4/1997 | Tien | 224/272 |
| 5,622,296 | 4/1997 | Pirhonen et al. | 224/197 |
| 5,730,342 | 3/1998 | Tien | 224/272 |

*Primary Examiner*—Allan N. Shoap
*Assistant Examiner*—Gregory M. Vidovich
*Attorney, Agent, or Firm*—Levine & Mandelbaum

[57] ABSTRACT

A holder assembly for cellular phones is disclosed. The holder assembly allows a cellular phone to be smoothly rotated around a holding button in either direction when a user, having the phone on his belt, is seated and presses against the top end of the phone. Therefore, the holder assembly allows the phone to be almost free from pressing against a user's body when the user is seated. The holder assembly overloads or tensions neither the clip of the holder nor a user's belt, thereby allowing the clip to be free from being deformed and the user's belt to be free from being unexpectedly torn. The holding button may be attached to a cellular phone or a phone case.

3 Claims, 8 Drawing Sheets

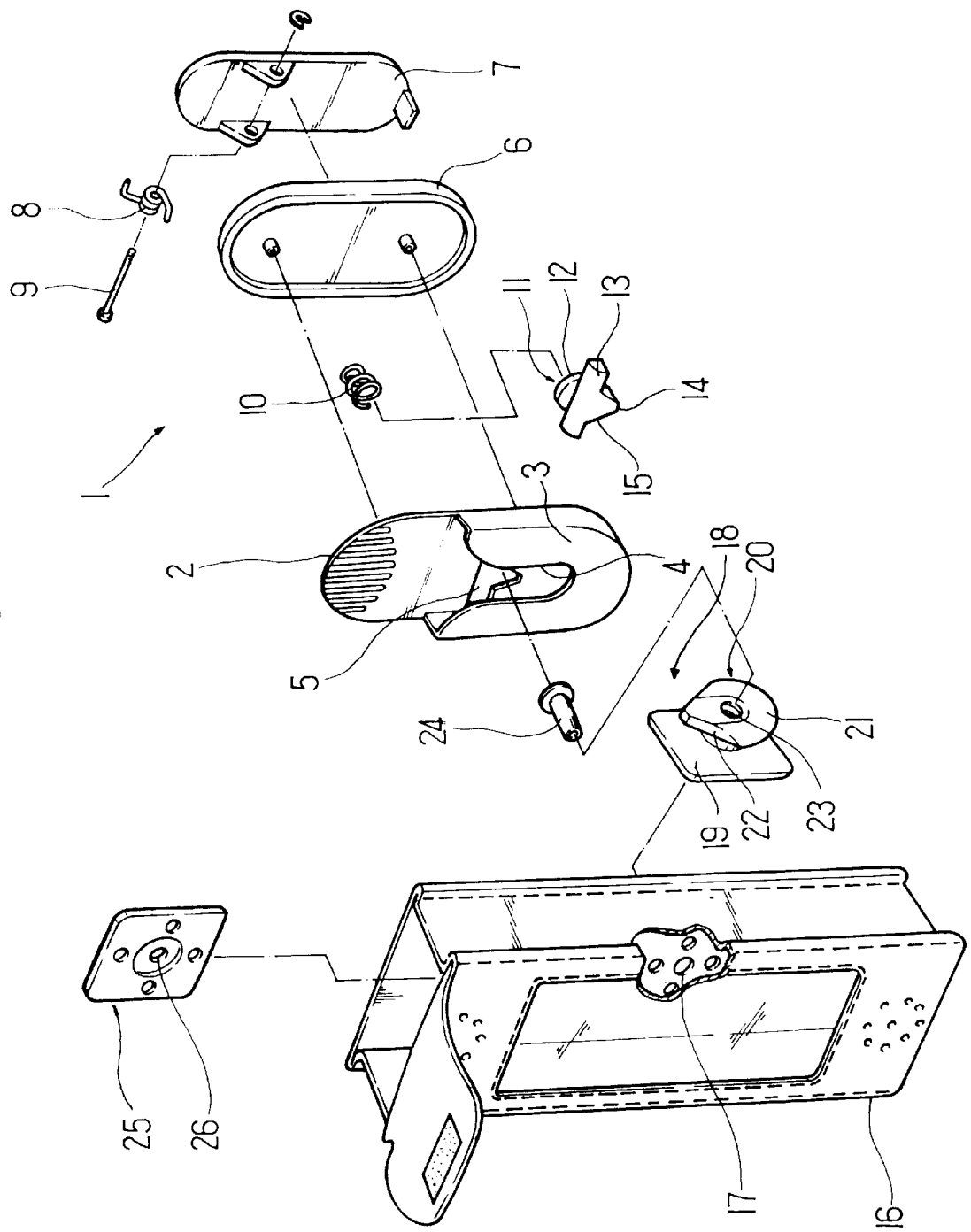

HOLDER ASSEMBLY FOR CELLULAR PHONES

BACKGROUND OF THE INVENTION

1. Field of the Invention

The present invention relates, in general, to a holder assembly for cellular phones and, more particularly, to a holder assembly capable of allowing a cellular phone held on a user's belt to be free from pressing against a part of a user's body, and being prevented from the occurrence of any deformation particularly when a user with the phone is seated.

2. Description of the Prior Art

Cellular phones, which are widely used in accordance with development of communications instruments, are generally classified into two types, that is, digital and analog cellular phones. Each of the above cellular phones is used while being received in a phone case, which is holed in order to form a plurality of holes on the portions corresponding to the receiver and transmitter parts of the cellular phone.

In order to simply carry a cellular phone, the cellular phone is received in a case and is held on the belt of a user with a belt holder being clipped on the belt. An example of a typical holder assembly for cellular phones is shown in FIG. 1. As shown in the drawing, the typical holder assembly is comprised of a belt holder H, which is produced separately from a phone case S and is clipped on a user's belt. A cased cellular phone T is detachably held on the holder H. The belt holder H comprises a base panel P, which is provided with a clip K on its back surface. A cover C, with a button holder, is fixedly mounted to the front surface of the above base panel P. In the above cover C, the outside wall of the button holder is vertically slitted to a length in order to form a U-shaped slit I. The holder H also includes a snap bolt B, which is positioned between the cover C and the base panel P and slightly projects from the inside wall of the button holder, and is normally biased by a coil spring (not shown).

Meanwhile, the back surface of the case S is provided with a holding button A, which is selectively and detachably held on the holder H clipped on a user's belt. The cased cellular phone T is held on the holder H by inserting the holding button A of the case S into the U-shaped slit I of the holder H clipped on the belt. In order to use the cellular phone T, the cased phone T is removed from the holder H by pulling up the phone T from the holder H.

The above holder assembly is problematic in that it causes the cased cellular phone T to press against a part of a user's body when a user, having the phone T on his belt, is seated. In addition, the cased cellular phone T in the above state causes both the clip K of the holder H and the user's belt to be overloaded and tensioned, thereby causing the clip K to be permanently deformed or the user's belt to be unexpectedly torn.

SUMMARY OF THE INVENTION

It is, therefore, a primary object of the present invention to provide a holder assembly for cellular phones in which the above problems caused by the typical holder assembly can be overcome and of which the holding button may be smoothly rotated at an angle of rotation in either direction when the holding button is inserted into a holder, thus allowing a cellular phone to be smoothly rotated around the holding button into a horizontal position when a user is seated and presses against the top end of the phone.

In order to accomplish the above object, the present invention provides a holder assembly for cellular phones comprising: a holding button attached to one of either a cellular phone or a phone case, the button including: a base plate adapted for attaching the holding button to one of either the cellular phone or the phone case; and a button member connected to the center of the base plate, the button member having a pressing part and a wedge part at its outside edge, with both side surfaces of the wedge part converging into the top end of the wedge part; a holder clipped on a belt and adapted for detachably holding the button so as to hold the cellular phone on the belt, the belt holder having a T-shaped opening; a T-shaped snap bolt movably set in the T-shaped opening of the holder and biased by a spring at its back surface, the snap bolt being adapted for selectively holding the button in the holder, the snap bolt including: a horizontal part curved at its upper front surface, thus having a radius of curvature suitable for allowing the snap bolt to be selectively retracted into the T-shaped opening when the bolt is pressed by the pressing part of the holding button; and a wedge part integrated with the bottom center of the horizontal part, with both side surfaces of the wedge part converging into the lower end of the wedge part, the wedge part of the snap bolt being brought into contact with the wedge part of the holding button received in the holder, thus allowing the holding button and the cellular phone to be rotatable in either direction.

In an embodiment, the holding button is attached to the phone case by both a fixing plate positioned at the inside surface of the phone case and a coupling pin fixing the holding button to the fixing plate with the back wall of the phone case being interposed between the holding button and the fixing plate.

In another embodiment, an adhesive layer is applied on the back surface of the base plate of the holding button, thus allowing the holding button to be attached to the cellular phone.

The holder assembly of this invention allows a cellular phone to be smoothly rotated around the holding button in either direction when a user, having the phone on his belt, is seated and presses against the top end of the phone. Therefore, the holder assembly allows the phone to be almost free from pressing against a user's body when the user is seated. The holder assembly overloads or tensions neither the clip of the holder nor a user's belt, thereby allowing the clip to be free from being deformed and the user's belt to be free from being unexpectedly torn.

BRIEF DESCRIPTION OF THE DRAWINGS

The above and other objects, features and other advantages of the present invention will be more clearly understood from the following detailed description taken in conjunction with the accompanying drawings, in which:

FIG. 2 is an exploded perspective view showing the construction of a holder assembly for cellular phones in accordance with the primary embodiment of the present invention;

DESCRIPTION OF THE PREFERRED EMBODIMENTS

Figure 1:
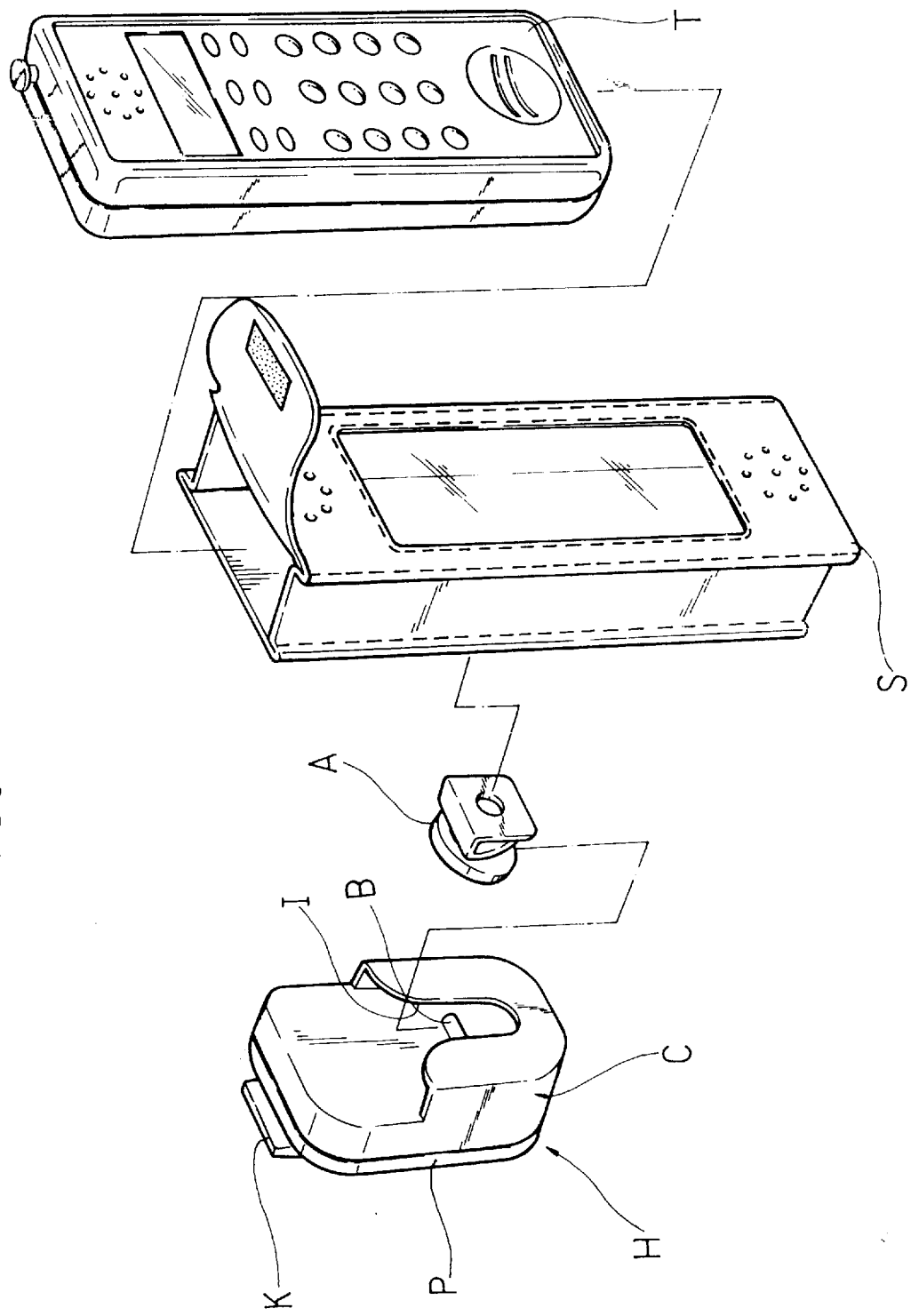
FIG. 1 is an exploded perspective view showing the construction of a typical holder assembly for cellular phones.

FIG. 2 shows the construction of a holder assembly for cellular phones in accordance with the primary embodiment of the present invention. As shown in the drawings, the holder assembly of this invention is comprised of a belt holder 1, which is produced separately from a phone case 16 and is clipped on a user's belt. The holder 1 detachably holds a cased cellular phone on the belt. The belt holder 1 comprises a base panel 6, which is provided with a clip 7 on its back surface. A cover 2, with a button holder 3, is fixedly mounted to the front surface of the above base panel 6. The cover 2 has a T-shaped opening 5 at the center of the inside wall of the button holder 3. In the above cover 2, the outside wall of the button holder 3 is vertically slitted to a length, thus forming a U-shaped slit 4. The clip 7 is coupled to the back surface of the base panel 6 by a hinge pin 9, with a torsion spring 8 being fitted over the pin 9 and normally biasing and closing the clip 7.

The holder 1 also has a T-shaped snap bolt 11, which is arranged between the cover 2 and the base panel 16 and is received in the T-shaped opening 5 of the cover 2. The snap bolt 11 has a configuration corresponding to the T-shaped opening 5 and is biased by a coil spring 10 at its back surface, thus normally and slightly projecting from the opening is to the button holder 3. The snap bolt 11 is comprised of a circular base part 12 at which the bolt 11 is biased by the spring 10. A horizontal part 13 is integrated with the front surface of the base part 12 and is smoothly rounded at its upper front surface, thus having a radius of curvature suitable for allowing the bolt 11 to be selectively retracted into the opening 5 while compressing the spring 10 when the bolt 11 is pressed by a holding button 18 of the phone case 16. A wedge part 14, having two inclined surfaces 15 at both side walls, is integrated with the bottom center of the horizontal part 13. The two inclined surfaces 15 converge into the lower end of the wedge part 14.

The coil spring 10 is stopped by the circular base part 12 of the snap bolt 11 and the base panel 6 at both ends thereof, thus normally biasing the snap bolt 6 toward the button holder 1 of the cover 2.

The holding button 18 is mounted to a coupling hole 17 of the phone case 16. The holding button 18 is comprised of a base plate 19 and a button member 20. The button member 20, which is connected to the center of the base plate 19 by a coupling pin 24, has an arcuate pressing part 21 and a wedge part 22 at its outside edge. The pressing part 21 is provided at the lower portion of the button member 20 and is rounded at its outside edge, thus having a radius of curvature. Meanwhile, the wedge part 22 is provided at the upper part of the button member 20 and has two inclined surfaces which converge into the top end of the wedge part 22. Both the base plate 19 and the button member 20 have a pin hole at their centers, thus receiving the coupling pin 24.

In the drawing, the reference numeral 25 denotes a fixing plate, which is positioned inside the phone case 16 and is assembled with the holding button 18 by the coupling pin 24, with the back wall of the phone case 16 being interposed between the base plate 19 of the button 18 and the fixing plate 25. In order to receive the coupling pin 24, the fixing plate 25 has a coupling hole 26 at its center.

The operational effect of the above holder assembly will be described hereinbelow with reference to FIGS. 3A to 7.

Figure 3A:
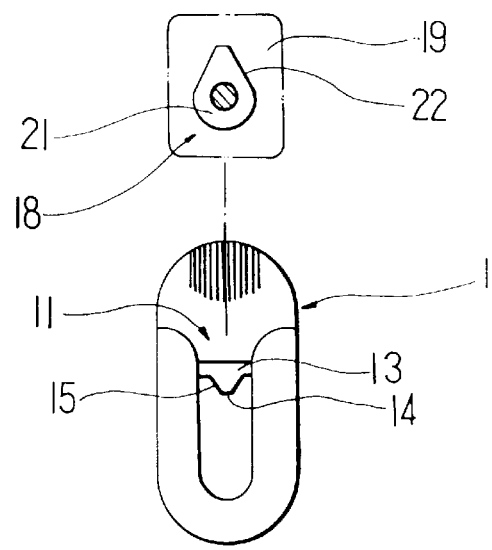
FIGS. 3A to 7 are side views and side sectional views showing the operation of the holder assembly of this invention when the holding button of a phone case is inserted into and held on a belt holder.
Figure 3B:
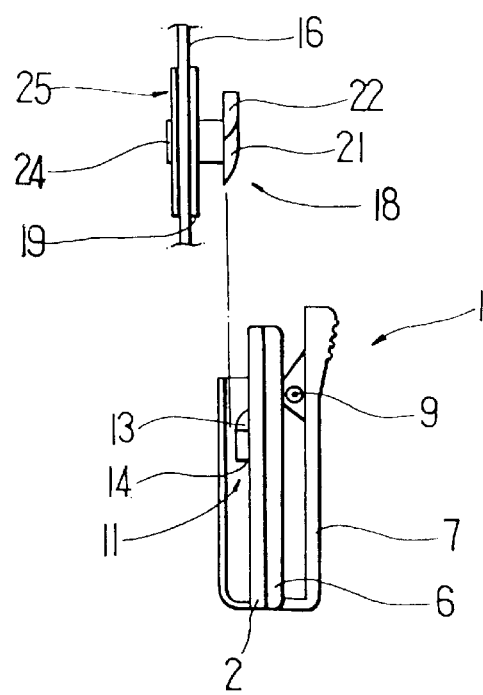
Figure 4A:
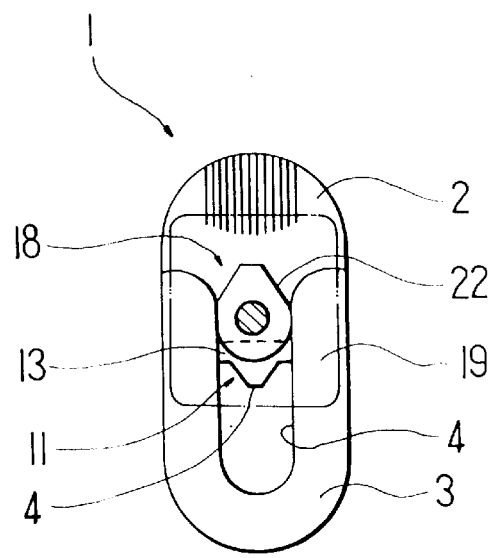
Figure 4B:
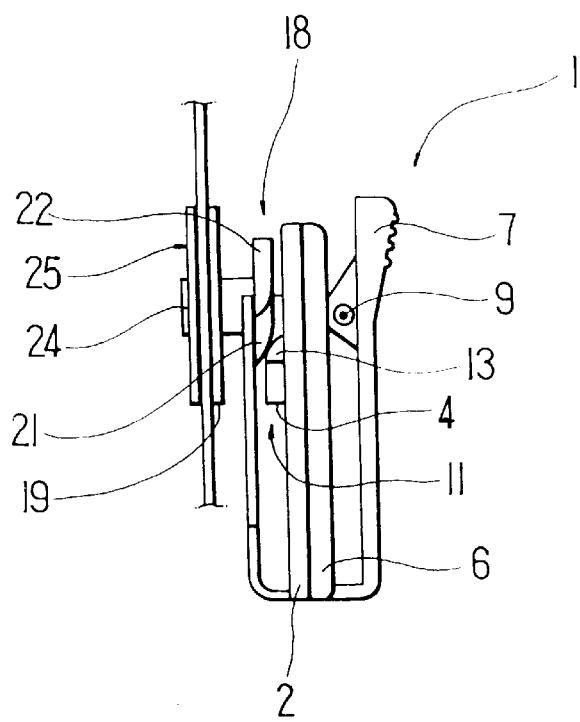

In operation of the above holder assembly, the holder 1 is clipped on a user's belt by the clip 7, while a cased cellular phone is held on or removed from the holder 1 by receiving or removing the holding button 18 into or from the U-shaped slit 4 of the holder 1. That is, the cased cellular phone, which is held by one hand of a user, is held on the holder 1 by receiving the holding button 18 of the case 16 into the U-shaped slit 4 of the holder 1. In the above state, the phone case 16 is primarily positioned around the holder 1 with the holding button 18 being positioned above the mouth of the U-shaped slit 4 as shown in FIGS. 3A and 3B.

Figure 5A:
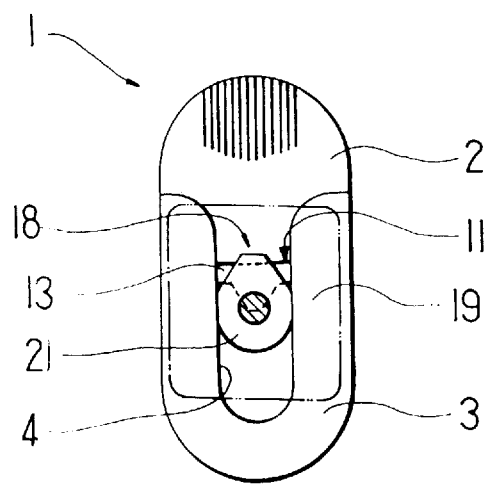
Figure 5B:
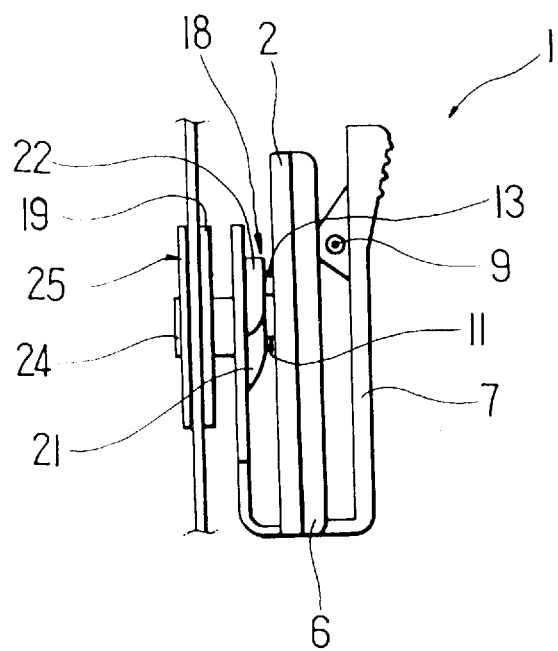

Thereafter, the cased phone is pushed down, thus inserting the holding button 18 into the slit 4 of the holder 1. In such a case, the rounded pressing part 21 of the button member 20 primarily comes into contact with the rounded horizontal part 13 of the snap bolt 11. When the cased cellular phone in the above state is further pushed down, the button member 20 presses the snap bolt 11 and allows the bolt 11 to be elastically retracted into the opening 5 of the cover 2 while compressing the spring 10 as shown in FIGS. 5A and 5B. The button member 20 thus passes by the bolt 11.

Figure 6A:
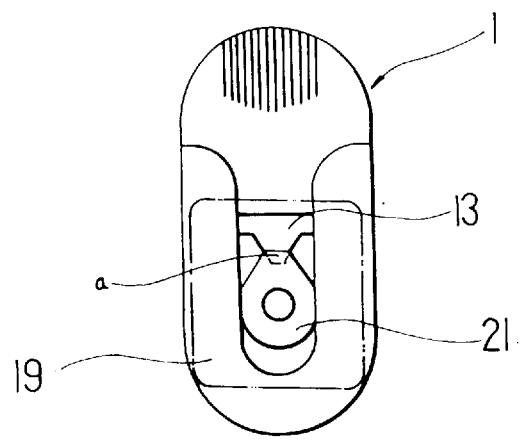
Figure 6B:
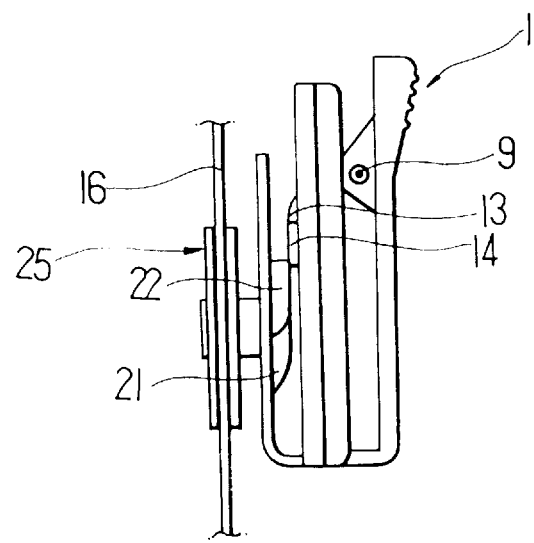
Figure 7:
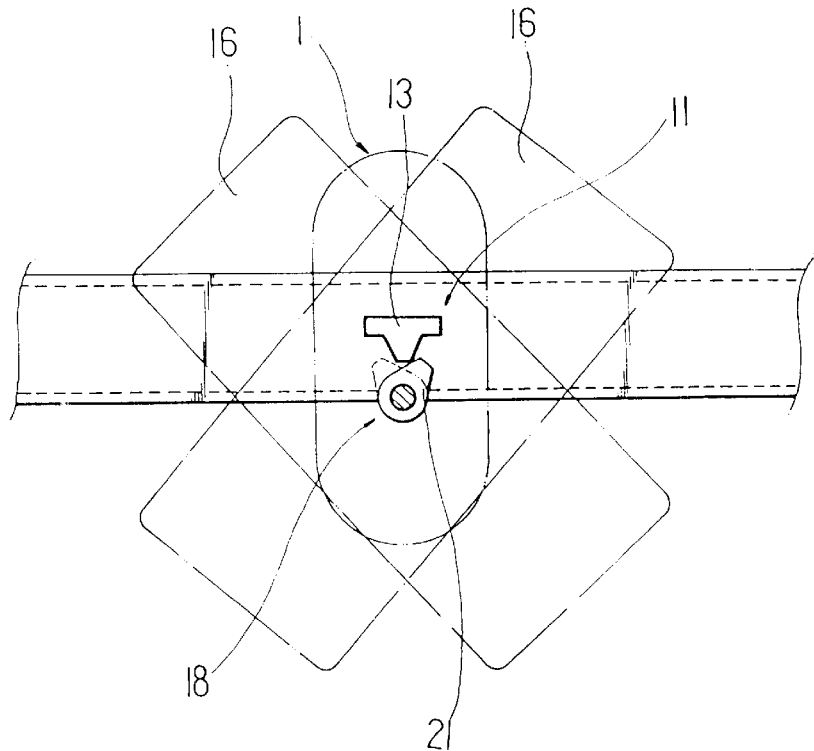

When the button member 20 almost completely passes by the snap bolt 11, the top end of the wedge part 22 of the button member 20 presses the lower end of the wedge part 14 of the bolt 11 as shown in FIGS. 6A and 6B. However, the contact area "a" between the two wedge parts 14 and 22 is too small to stably retain the contact position between the two parts 14 and 22. Therefore, when the holding button 18 in the above state is slightly rotated in either direction by the user, the wedge part 14 of the bolt 11 is released from the wedge part 22 of the button member 20. The bolt 11 in the above state is elastically returned to its original position by the restoring force of the spring 10, thus causing the phone case 16 to be held on the holder 1 at a position slightly rotated in either direction as shown in FIG. 7.

When the user, having the cased cellular phone on his belt, is seated, the top end of the phone is pressed by the user's body and is smoothly rotated around the holding button 18 in either direction. The phone is thus positioned almost horizontally and is free from pressing against the user's body.

Of course, the holding button 18 of the case 16 may be straightly inserted into the U-shaped slit 4 of the holder 1 without being rotated, thus maintaining the position of FIGS. 6A and 6B. However, the cased cellular phone in the above state is smoothly rotated in the same manner as described above and as shown in FIG. 7 when the user is seated and presses against the top end of the phone.

In a brief description, the holder assembly of this invention allows the phone case 16 to be easily and smoothly rotated around the holding button 18 in either direction when the top end of a cellular phone, received in the case 16, is pressed by a user's body. The holder assembly thus makes the phone be almost free from pressing against the user's body when the user is seated.

Figure 8:
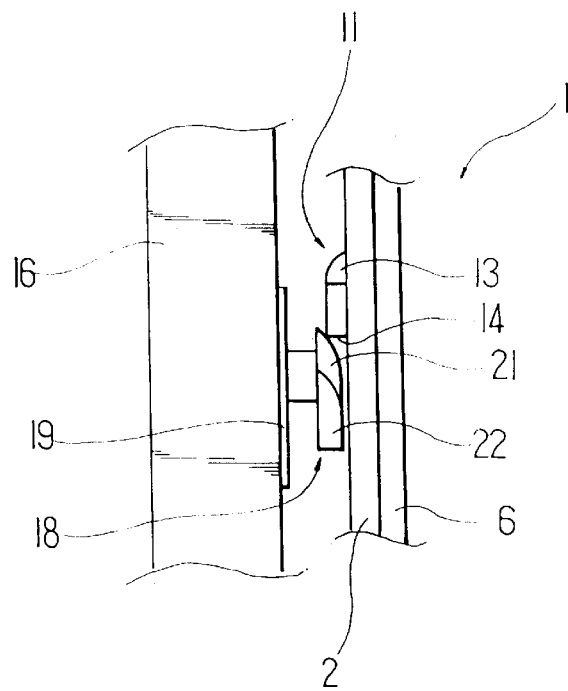
FIG. 8 is a side sectional view showing the operation of the holder assembly of this invention when the holding button is removed from the belt holder.

Once the button member 20 is seated in the U-shaped slit 4 of the holder 1 as shown in FIG. 7, one inclined surface of the holding button 18 is caught by one inclined surface 15 of the snap bolt 11 so that the phone case 16 is not unexpectedly separated from the holder 1. In order to remove the phone case 16 from the holder 1, the case 16 is primarily rotated in a direction at an angle of 90°–180°, thus bringing the rounded pressing part 21 of the button member 20 into contact with the wedge part 14 of the snap bolt, 11 as shown in FIG. 8. Thereafter, the case 16 is pushed up, thus being removed from the holder 1.

Figure 9:
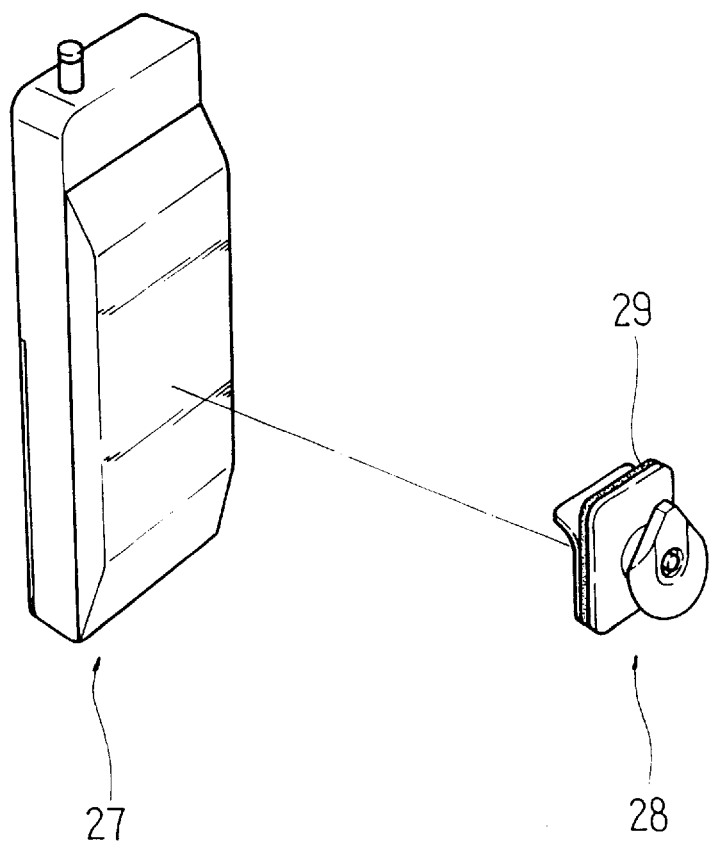
FIG. 9 is an exploded perspective view showing the construction of a holder assembly for cellular phones without having any phone case in accordance with another embodiment of the present invention.

FIG. 9 shows the construction of a holder assembly for cellular phones without having any phone case in accordance with another embodiment of this invention. In the above embodiment, the holding button 28 is directly attached to the back surface of a cellular phone 27. An adhesive layer 29 is applied on the back surface of the holding covered with is covered with a release paper. The release paper is removed from the holding button 28 prior to attaching the button 28 to the back surface of the cellular phone 27.

As described above, the present invention provides a holder assembly for cellular phones. The holder assembly of this invention allows a cellular phone to be smoothly rotated around a holding button in either direction when a user, having the phone on his belt, is seated and presses against the top end of the phone. Therefore, the holder assembly allows the phone to be almost free from pressing against a user's body when the user is seated. Another advantage of the above holder assembly resides in that it overloads or tensions neither the clip of the holder nor a user's belt, thereby allowing the clip to be free from being deformed and the user's belt to he free from being unexpectedly torn.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A holder assembly for cellular phones, comprising:
    a holding button adapted to be attached to one of either a cellular phone or a phone case, said button including:
        a base plate adapted for attaching the holding button to one of either the cellular phone or the phone case; and
        a button member connected to the center of said base plate, said button member having a pressing part and a wedge part at its outside edge, with both side surfaces of the wedge part converging into the top end of the wedge part;
    a holder having a clip adapted to be clipped on a belt and configured for receiving and for detachably holding said button therein so as to hold the cellular phone or the phone case on the belt, said holder having a T-shaped opening in a wall thereof;
    a T-shaped snap bolt movably set in the T-shaped opening of the holder and biased by a spring at its back surface, said snap bolt being adapted for selectively holding the button in the holder, said snap bolt including:
        a horizontal part curved at its upper front surface, thus having a radius of curvature suitable for allowing said snap bolt to be selectively retracted into the T-shaped opening when the bolt is pressed by the pressing part of the holding button; and
        a wedge part integrated with the bottom center of said horizontal part, with both side surfaces of the wedge part converging into the lower end of the wedge part, said wedge part of the snap bolt being brought into contact with the wedge part of the holding button received in the holder, thus allowing the holding button with the cellular phone or the phone case to be rotatable in either direction.

2. The holder assembly according to claim 1, wherein said holding button is adapted to be attached to said phone case by both a fixing plate positioned at a inside surface of the phone case and a coupling pin fixing the holding button to the fixing plate with a back wall of the phone case being interposed between the holding button and the fixing plate.

3. The holder assembly according to claim 1, wherein an adhesive layer is applied on a back surface of said base plate of the holding button, thus allowing the holding button to be attached to the cellular phone.

* * * * *